(12) United States Patent
Abke

(10) Patent No.: US 10,926,791 B2
(45) Date of Patent: Feb. 23, 2021

(54) ELECTROMAGNETIC STEERING FOR MOTORCYCLES AND AUTOMOBILES

(71) Applicant: Honda Motor Co., Ltd., Tokyo (JP)

(72) Inventor: Timothy A. Abke, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 214 days.

(21) Appl. No.: 16/137,807

(22) Filed: Sep. 21, 2018

(65) Prior Publication Data
US 2020/0094867 A1 Mar. 26, 2020

(51) Int. Cl.
*B62D 5/04* (2006.01)

(52) U.S. Cl.
CPC ............. *B62D 5/0418* (2013.01); *B62D 5/04* (2013.01)

(58) Field of Classification Search
CPC .................................. B62D 5/04; B62D 5/0418
See application file for complete search history.

(56) References Cited

U.S. PATENT DOCUMENTS

| | | | |
|---|---|---|---|
| 6,575,263 B2 | 6/2003 | Hjelsand et al. | |
| 7,207,411 B2 | 4/2007 | Duits et al. | |
| 7,533,747 B2 * | 5/2009 | Heinen | B60L 50/50 180/65.51 |
| 8,457,842 B2 | 6/2013 | Kulkarni et al. | |
| 2006/0162987 A1 * | 7/2006 | Hagl | B66F 9/07572 180/411 |
| 2012/0220189 A1 | 8/2012 | Raynor | |

FOREIGN PATENT DOCUMENTS

| | | |
|---|---|---|
| CN | 203306086 | 11/2013 |
| CN | 106114613 | 11/2016 |
| KR | 100622753 | 9/2006 |

\* cited by examiner

*Primary Examiner* — Kevin Hurley
(74) *Attorney, Agent, or Firm* — Rankin, Hill & Clark LLP

(57) ABSTRACT

A vehicle steering assembly and method for steering a vehicle includes an array of electromagnets fixed relative to the vehicle, and a charged plate that is moveable with respect to the array and connected to a wheel that determines the travel direction of the vehicle. When activated, the electromagnets produce a charge that is opposite that of the charged plate, thus attracting the charged plate. The electromagnets are selectively activated to move a centroid of a charged region about the array to thereby move the charged plate in a desired direction. Movement of the charged plate causes a corresponding movement of the wheel to which it is connected. Movement of the wheel thus establishes a travel direction for the vehicle.

20 Claims, 5 Drawing Sheets

ELECTROMAGNETIC STEERING FOR MOTORCYCLES AND AUTOMOBILES

BACKGROUND

Vehicles, including automobiles and motorcycles, typically include a mechanical steering apparatus that is connected to one or more wheels to change an orientation of the wheel for steering the vehicle in a desired travel direction. These systems typically include steering linkages (e.g. cam and lever, rack and pinion) connected to the wheel or axle to transfer movement of a steering handle to the wheels.

The steering linkages can have complex and complicated designs in order to account for the different geometries in each particular type of vehicle. These linkages also include a number of parts that contact and move relative to each other, and thus the linkages experience friction and wear between them. This friction, as well as friction between the wheel and the road, is usually overcome by a dedicated steering motor that assists a driver in moving the linkages so as to steer the vehicle. However, the need for this motor results in further parts and associated costs being added to the vehicle. Additionally, the wear between the parts of the linkages can cause failure of the linkages. These linkages can be expensive to manufacture and install, and because of their many parts, can also result in a slight delay between when a driver moves a steering handle of the vehicle and when the wheels actually respond to the movement of the steering handle.

BRIEF DESCRIPTION

According to one aspect, a vehicle steering assembly includes an array of electromagnets, and a charged plate arranged adjacent to the array and moveable with respect to the array, the charged plate having a first charge and being connected to a wheel of a vehicle. Upon activation of one or more of the electromagnets of the array, a charged region having a second charge opposite from the first charge is produced on the array. The charged region defines a centroid to which the charged plate is attracted and which is movable about the array by selective activation of one or more of the electromagnets of the array. Movement of the centroid about the array causes the charged plate to move relative to the array, which causes movement of an axis of rotation of the wheel to thereby steer the vehicle.

According to another aspect, a vehicle includes a wheel having an axis of rotation, and a steering assembly operably connected to the wheel to move the axis of rotation of the wheel to thereby steer the vehicle. The steering assembly includes an array of electromagnets, and a charged plate arranged on the wheel and adjacent to the array. The charged plate is moveable with respect to the array and has a first charge. Upon activation of one or more of the electromagnets of the array, a charged region having a second charge opposite from the first charge is produced on the array. The charged region defines a centroid to which the charged plate is attracted and which is movable about the array by selective activation of one or more of the electromagnets of the array. Movement of the centroid about the array causes the charged plate to move relative to the array, which causes movement of the axis of rotation of the wheel to thereby steer the vehicle.

DETAILED DESCRIPTION

Figure 1:
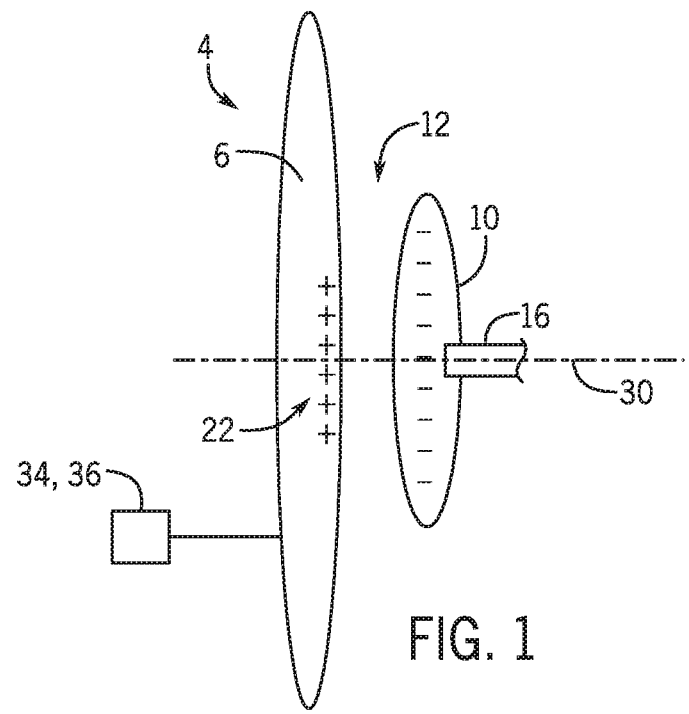
FIGS. 1 and 2 are schematic top views of steering assemblies in accordance with the present subject matter.

A vehicle includes a steering assembly for controlling one or more vehicle wheels that are used to establish a travel direction of the vehicle. The steering assembly includes a charged plate and an array of electromagnets. The charged plate is connected to the wheel that determines the travel direction of the vehicle, and is paired with the array of electromagnets. When activated, the electromagnets produce a charge opposite from that on the charged plate. These opposite charges cause the charged plate to be magnetically attracted to the activated electromagnets. When a steering handle (e.g. a steering wheel or a handle bar) of the vehicle is manipulated by a user, various electromagnets in the array are selectively activated to produce a charged area having a centroid. Movement of the centroid about the array causes the charged plate to move along with the centroid and relative to the array. This movement of the charged plate causes a corresponding movement of the wheel to which the charged plate is attached, thus resulting in the vehicle being steered in a travel direction during movement of the vehicle. In several embodiments, the wheel is not connected to mechanical steering linkages that transfer user input from the steering handle to the wheels.

As compared to traditional steering mechanisms, such as mechanical steering linkages, including for example cam and lever, rack and pinion, etc., use of the present steering assembly in a vehicle may help reduce the number of mechanical parts required to steer the vehicle, and may allow for user input on a steering handle to be transferred more smoothly and faster to the vehicle wheels. Further, the present steering assembly includes a gap between the charged plate and the array of electromagnets and therefore, no friction is created between the array and the charged plate, and thus no wear occurs between these components.

Referring to FIGS. 1-9, a vehicle 2 includes a vehicle steering assembly 4 used to control an orientation of a wheel(s) 14 that contact the ground and whose orientation establishes the travel direction of the vehicle 2.

The vehicle 2 is not limited by the present subject matter, and may include, for example, a one-wheeled vehicle having the one wheel 14 establishing the travel direction of the vehicle 2 (FIGS. 7-8); a motorcycle or other two-wheeled vehicle having two wheels, but where only one wheel 14 (e.g. front wheel) establishing the travel direction of the vehicle 2 (FIGS. 7-8); a two-wheeled vehicle 2 where both wheels 14 establish the travel direction of the vehicle 2 (FIG. 9); an automobile or other vehicle with three or more wheels where only two wheels 14 establish the travel direction of the vehicle 2 (FIG. 6); or a multi-wheeled vehicle having more than two wheels 14 that establish the travel direction of the vehicle 2. Other types of vehicles 2 can include the steering assembly 4 according to the present subject matter. While FIGS. 6 and 9 only depict the two wheels 14 that determine the travel direction of the vehicle 2, and FIGS. 7-8 only depict the one wheel 14 determining the travel direction of the vehicle 2, it will be appreciated that although not depicted, the vehicles 2 of FIGS. 6-9 may include one or more additional wheels that contact the ground and upon which the vehicles 2 travel but that do not determine the travel direction of the vehicles 2.

The wheel 14 that determines/establishes the travel direction of the vehicle 2 has an axis of rotation 30 that is movable, as opposed to fixed, relative to the vehicle 2 and/or relative to the array 6 of electromagnets 8. The orientation of the axis of rotation 30 of the wheel 14 can establish the travel direction of the vehicle 2. The travel direction of the vehicle 2 may be perpendicular to an axis of rotation 30 of the wheel 14. In other words, the orientation of the axis of rotation 30 of the wheel 14 determines the travel direction of the vehicle 2. The axis of rotation 30 may correspond to the axle 16 of the wheel 14. The axis of rotation 30 may be moved to steer the vehicle 2 by rotating the axis 30 about a point 32, which point 32 may lie on the axis of rotation 30 as depicted in the figures. This rotation of the axis 30 about the point 32 may result from changing the orientation of wheel 14 with respect to the vehicle 2 and/or the array 6. To control or change this orientation of the wheel 14, the steering assembly 4 includes the charged plate 10 and the array 6 of electromagnets 8, which may be manipulated to move/hold the wheel 14 in a desired orientation. The wheel 14 used to steer the vehicle 2 may include one charged plate 10 connected thereto (FIGS. 1, 2) or two charged plates 10 connected thereto (FIGS. 6-9). In one exemplary embodiment where two charged plates 10 are connected to the wheel 1, the two charged plates 10 are on opposite sides of the wheel 14 as depicted in FIGS. 6-9.

Figure 2:
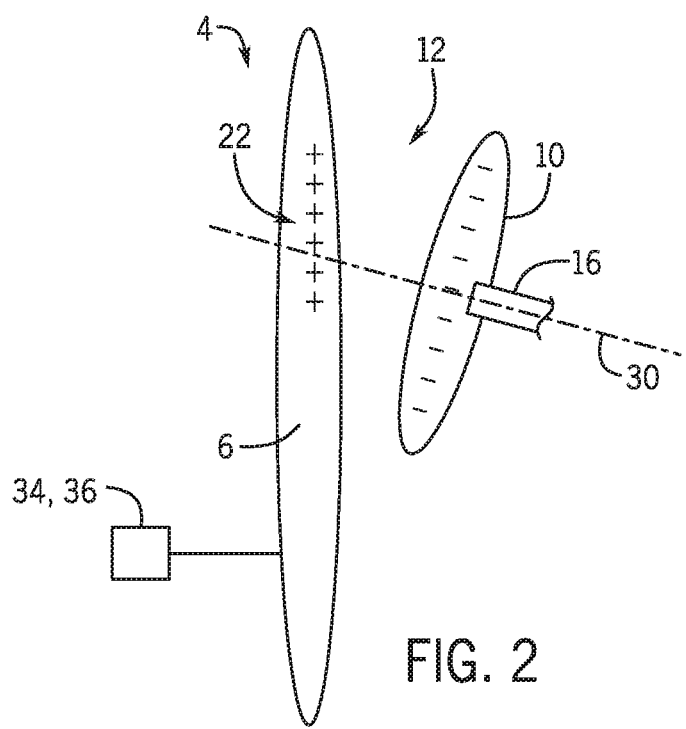
Figure 3:
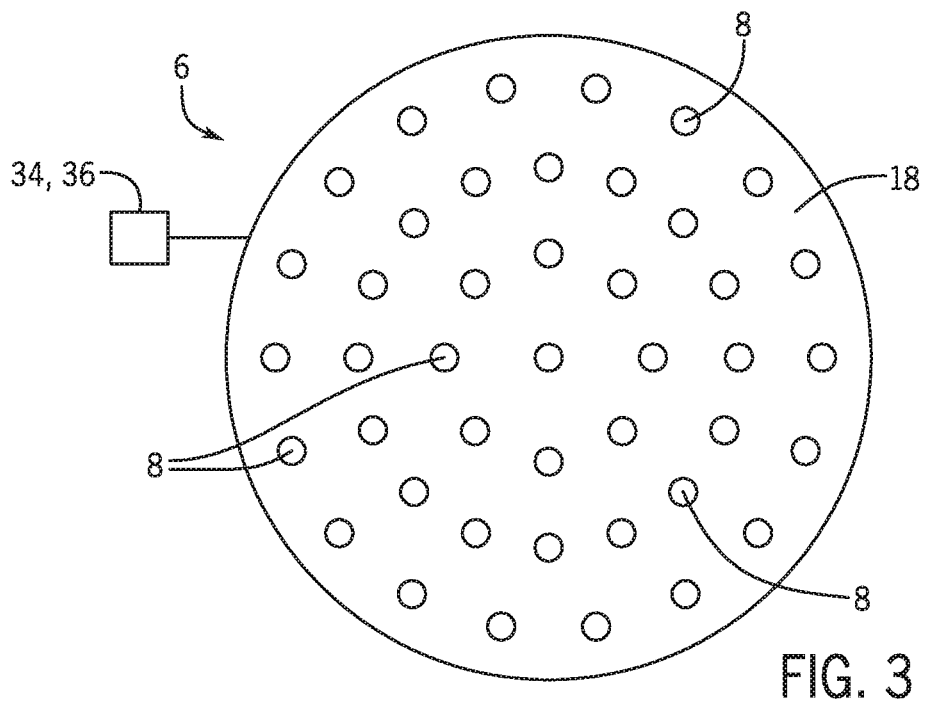
FIG. 3 is a schematic side view of an array of electromagnets in accordance with the present subject matter.

The charged plate 10, which is connected to the wheel 14, is movable with respect to the array 6, and may be charged with a first electrical charge, e.g. a positive charge or a negative charge. FIGS. 1 and 2 show the charged plate 10 having a negative electrical charge indicated by minus signs "−". In this instance, the electromagnets 8 in the array 6 produce a second electrical charge that is a positive electrical charge (opposite to the negative electrical charge of the charged plate 10) so that the charged plate 10 is magnetically attracted to the activated electromagnets 8. The positive electrical charge of the electromagnets 8 is indicated in the figures by plus signs "+". However, it should be understood that the first electrical charge on the charged plate 10 may instead be a positive charge, with the second electrical charge produced by the electromagnets 8 being negative. The charged plate 10 may include, but is not limited to, a permanent magnet or a metal plate with a current passing therethrough. The charged plate 10 may be directly connected to the wheel 14 used to steer the vehicle 2, to an axle 16 that is connected to the wheel 14, or by other configurations. If more than one charged plate 10 is included in the steering assembly 4 (FIGS. 6-9), the multiple charged plates 10 may have the same or different charges between them.

Figure 7:
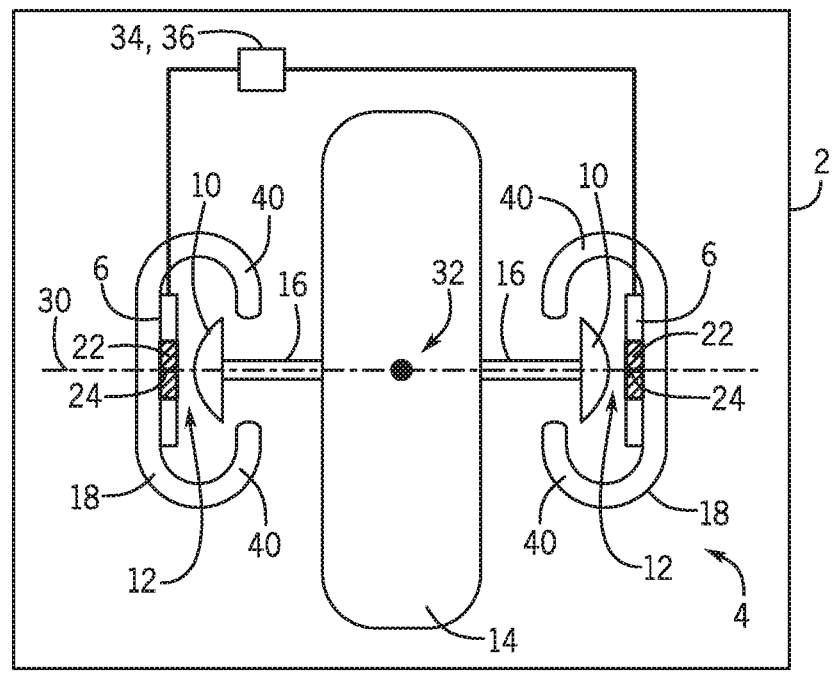
Figure 8:
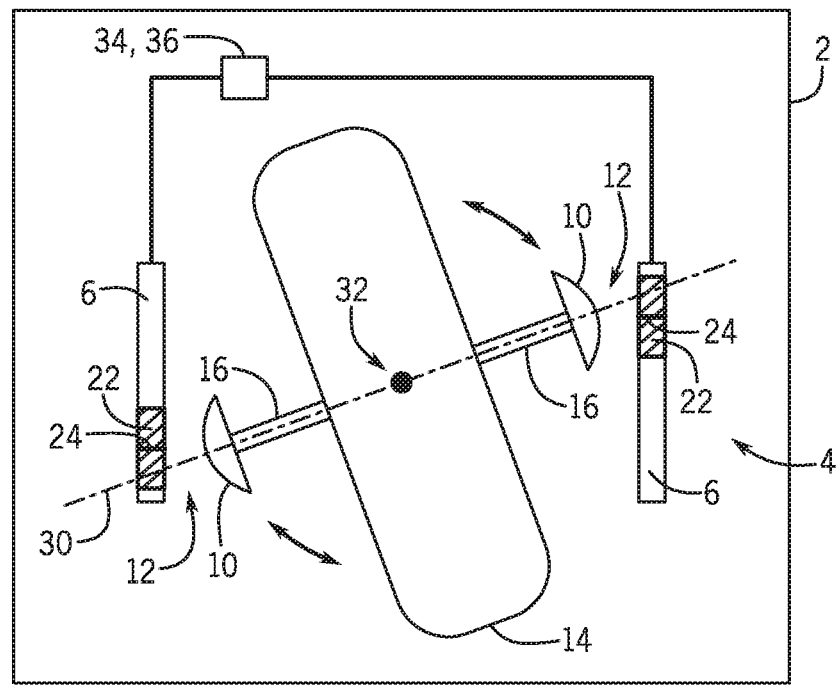
Figure 9:
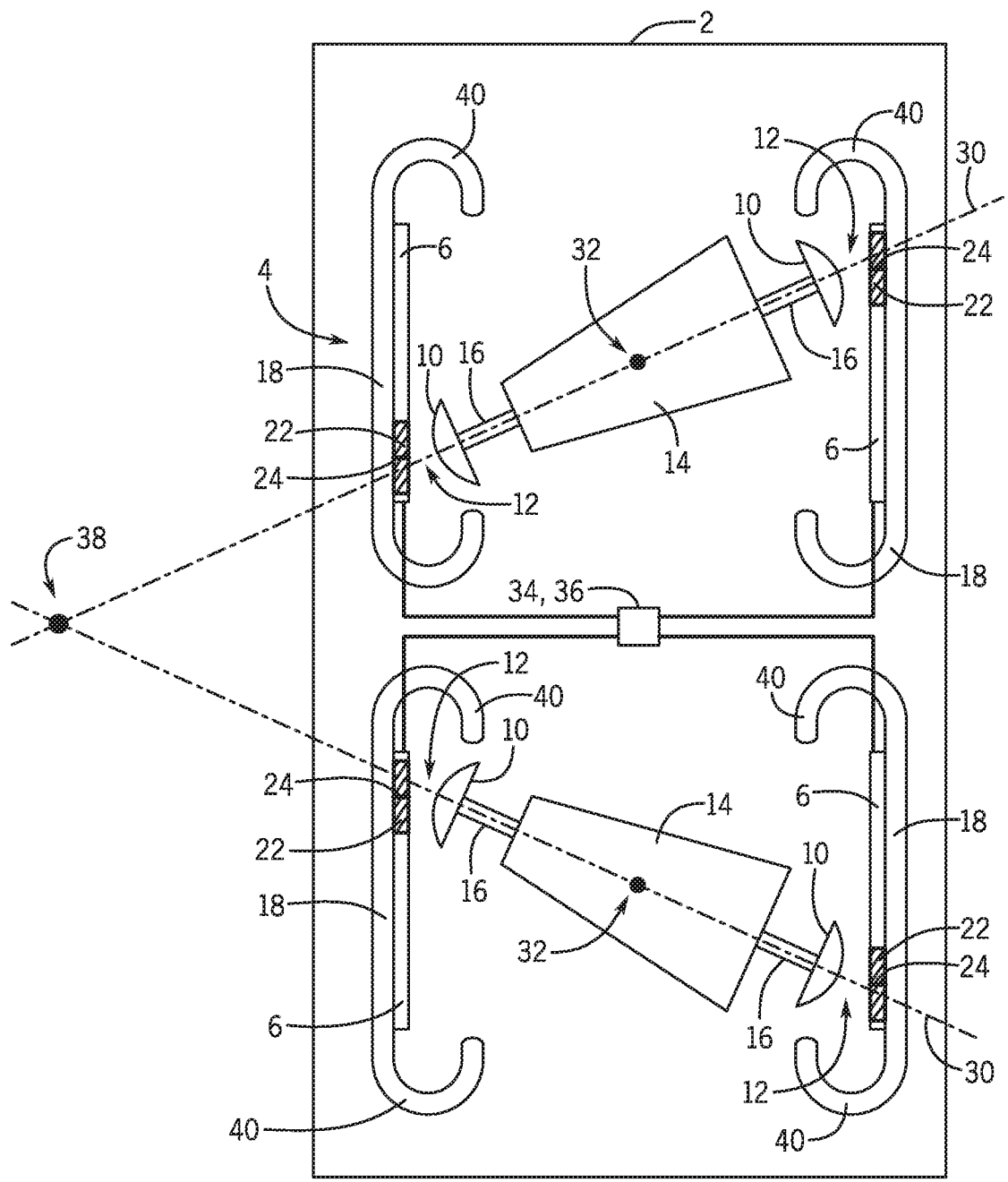

The charged plate 10 is paired with a corresponding array 6 of electromagnets 8, which upon activation produce a charge opposite to that of the charged plate 10 and thus magnetically attract the charged plate 10. The array 6 and the charged plate 10 are separated by a gap 12 and do not contact each other. To ensure no contact between the charged plate 10 and the array 6, the array 6 may be fixed laterally (i.e. left and right in the figures) relative to the vehicle 2, such as on panel 18, and the charged plate 10 may be secured so as not to move axially along the axis of rotation 30 of the wheel 14 towards the array 6. Instead, the charged plate 10 may be secured to only pivot around point 32 along with the wheel 14 as depicted in the figures. The gap 12 is large enough to provide no contact between the charged plate 10 and the array 6, but is small enough to allow the charged plate 10 to be influenced by (e.g. moved or held in place) by the electrical field produced by the activated electromagnets 8. The steering assembly 4 may include one array 6 of electromagnets 8 associated with each wheel 14 that is used to establish the travel direction of the vehicle 2 (FIGS. 1-2 and 6); or may include two arrays 6 associated each wheel 14, with one array 6 on either side of the wheel 14 (FIGS. 7-9).

The electromagnets 8 may be activated to produce the second charge that is opposite from the first charge of the charged plate 10. The second charge may be either a positive charge or a negative charge depending on the charge of the associated charged plate 10. As shown in the figures, the electromagnets 8 are producing a positive charge as indicated by plus signs "+" on the array 6, which is opposite from the negative charge on the charged plate 10. These opposite charges cause the negatively charged plate 10, which is moveable, to be magnetically attracted to, and move towards the positively charged activated electromagnets 8, and specifically to the centroid 24 of the magnetic field produced by the activated electromagnets 8.

The electromagnets 8 may be arranged on a circular panel 18 or other structure of the vehicle 2. The panel 18 may be fixed relative to the vehicle 2, such that the array 6 is in a fixed position relative to the vehicle 2. The panel 18 may include a curved section 40 as depicted in FIGS. 7 and 9 in order to limit the pivoting of the axis 30 about the point 32. The curved section 40 may function to keep the charged plate 10 in close proximity to the array 6 of electromagnets 8 so that the charged plate 10 cannot escape, and is thus under the influence of, the magnetic field produced by the activated electromagnets 8.

Figure 4:
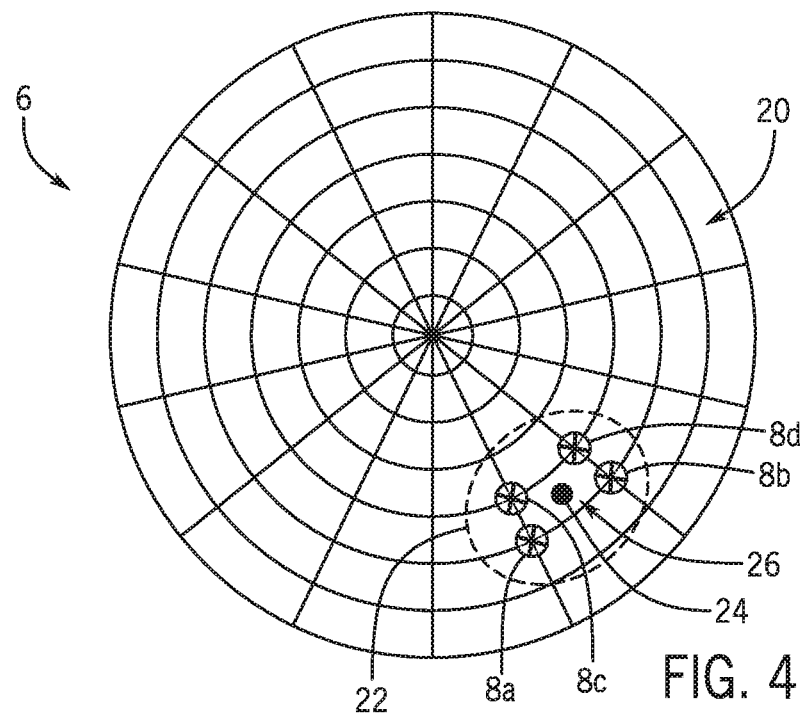
FIGS. 4 and 5 are schematic side views of grid patterns showing an exemplary arrangement used for placement of electromagnets in and array in accordance with the present subject matter.
Figure 5:
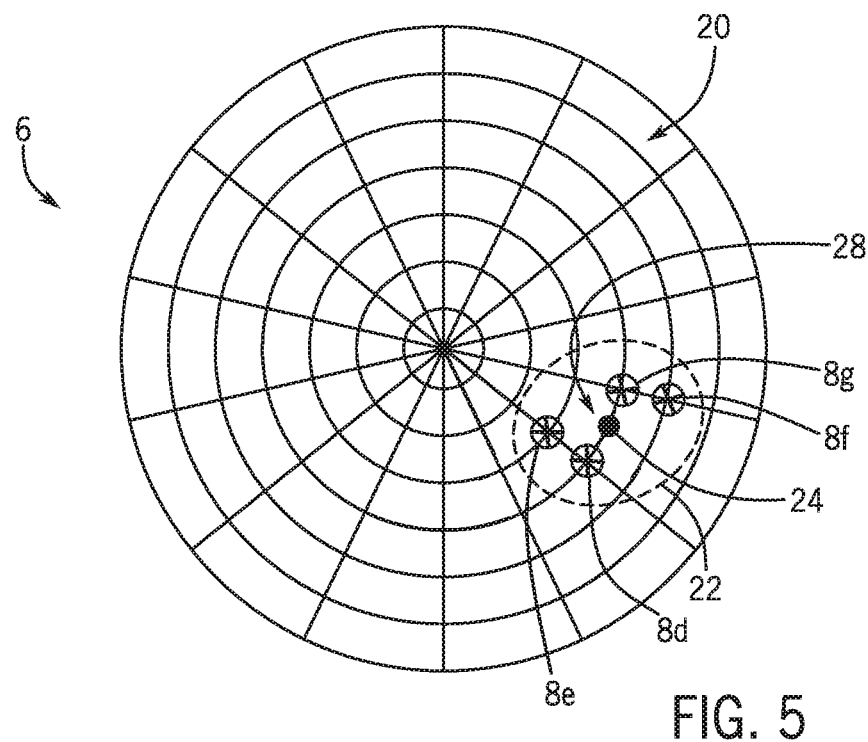

The electromagnets 8 may be arranged in various configurations on the panel 18, and such configurations are not particularly limited by the present subject matter. In an exemplary embodiment, the electromagnets 8 are arranged in a generally radial configuration as shown for example in FIG. 3. Spacing between the electromagnets 8 in the array 6 is not particularly limited, and may be determined as required for a particular application of the steering assembly 4, which may be based on the size of the electromagnets 8 or the strength of the magnetic field produced by the electromagnets 8. The radial pattern may comprise a grid 20 as depicted in FIGS. 4 and 5 for example, which includes radial lines intersecting a series of concentric circles. The electromagnets 8 may be arranged at some or all of the intersections between the radial lines and the concentric circles.

Activation of the electromagnets 8 produces a charged region 22 on the array 6. The charged region 22 defines a centroid 24, which is the center of the magnetic field produced by the activated electromagnets 8. The charged plated 10 is attracted to the charged region 22, and specifically to the centroid 24 of the charged region 22, because of the opposite charges between them.

As depicted between FIGS. 4 and 5 for example, the centroid 24 can be shifted or moved from one location on the array 6 (FIG. 4) to another location (FIG. 5) by activating and/or deactivating specific electromagnets 8. As depicted in FIG. 4, the centroid 24 is located at a first location 26 on the array 6, which is the middle of the electric field produced by activated electromagnets 8a, 8b, 8c, 8d (indicated at being activated by "+"). The centroid 24 can be moved from the first location 26 to a second location 28 on the array 6 by deactivating three electromagnets 8a-8c, keeping electromagnet 8d activated, and activating three other electromagnets 8e-8g, such that the charged region 22 is in a different location on the array 6, and the centroid 24 (i.e. the middle of the electric field produced by activated electromagnets 8d-8g) is now at the second location 28 as depicted in FIG. 5. The centroid 24 can be moved to other locations on the array 6 as desired, by activating and/or deactivating different electromagnets 8 than those depicted in FIGS. 4-5. This and other movements of the centroid 24 about the array 6 cause a corresponding movement of the charged plate 10, since the charged plate 10 is magnetically attracted to the centroid 24.

Movement of the centroid 24 causes movement of the charged plate 10, which may change the orientation of the axis of rotation 30 of the wheel 14 with respect to the vehicle 2. Because the array 6 may be circularly arranged, movement of the centroid 24 about the array 6 may produce various changes in the orientation of the axis of rotation 30, such as rotation of the wheel 14 about a yaw axis for steering (e.g. rotation of the wheel 14 about a vertical axis, which causes horizontal movement of the axis of rotation 30), and/or rotation of the wheel 14 about a roll axis for tilting of the wheel 14 from side to side (e.g. rotation of the wheel 14 about a longitudinal axis, which causes vertical movement of the axis of rotation 30), where a pitch axis of the wheel 14 is the axis of rotation 30 of the wheel 14.

An exemplary changing of the orientation of the axis of rotation 30 of the wheel 14 with respect to the array 6 and vehicle 2 is shown for example between FIGS. 7 and 8. As depicted in FIG. 7, the axis of rotation 30 is substantially perpendicular to the closest face of the array 6. In this configuration, the centroid 24 on each array 6 may be at the center of the array 6. However, as depicted in FIG. 8, the axis of rotation 30 has been moved to an orientation that is not perpendicular to the closest face of the array 6. In this configuration, the centroid 24 on each array 6 may be nearer an edge of the array 6 and not in the center of the array 6 in order to turn the wheel 14 with respect to the vehicle 2. As will be appreciated, the wheel 14 could be turned in the opposite direction by opposite movement of the centroid 24 on the respective arrays 6.

Selective activation and deactivation of the electromagnets 8 on the array 6 may be implemented as a function of user input made to a steering handle 34 of the vehicle 2, or as a function of signals from an autonomous vehicle driving system 36, both of which may be in communication with the array(s) 6 of electromagnets 8 to control activation and/or deactivation of the electromagnets 8.

If included, the steering handle 34 can comprise, but is not limited to, a steering wheel arranged in passenger compartment of the vehicle 2, handle bars on a motorcycle, a joystick configuration, or a button(s). The steering handle 34 may be arranged on the vehicle 2 so that an occupant of the vehicle 2 can enter user input; or the steering handle 34 may be arranged remote from the vehicle 2, such as on a remote control or other control unit so that a non-occupant of the vehicle 2 can remotely enter the user input. The steering handle 34 can be used to steer the vehicle 2 by selectively move the axis of rotation 30 of the wheel 14, and/or to maintain the orientation of the axis of rotation 30.

User input to the steering handle 34 may include movement of the steering handle 34, for example turning the steering handle 34 such as in a steering wheel of an automobile or handle bars of a motorcycle. User input to the steering handle 34 may allow a user to steer the vehicle 2 by causing certain electromagnets 8 to be activated and/or deactivated on the array 6 as a function of the user input to the steering handle 34, thus resulting in movement of the charged region 22 and the centroid 24 about the array 6 from one location to another. Movement of the steering handle 34 thereby results in movement of the axis of rotation 30 of the wheel 14, thus causing the orientation of the wheel 14 to change. When the steering handle 34 is not subject to movement (e.g. held stationary by a user), the charged region 22 and the corresponding centroid 24 may remain stationary on the array 6. If the steering handle 34 remains stationary, then the charged region and centroid remain stationary on the array 6, thus causing the orientation of the wheels 14 to remain constant. The user input to the steering handle 34 allows a user to steer the vehicle 2 by moving or maintaining the orientation of the wheel 14.

Figure 6:
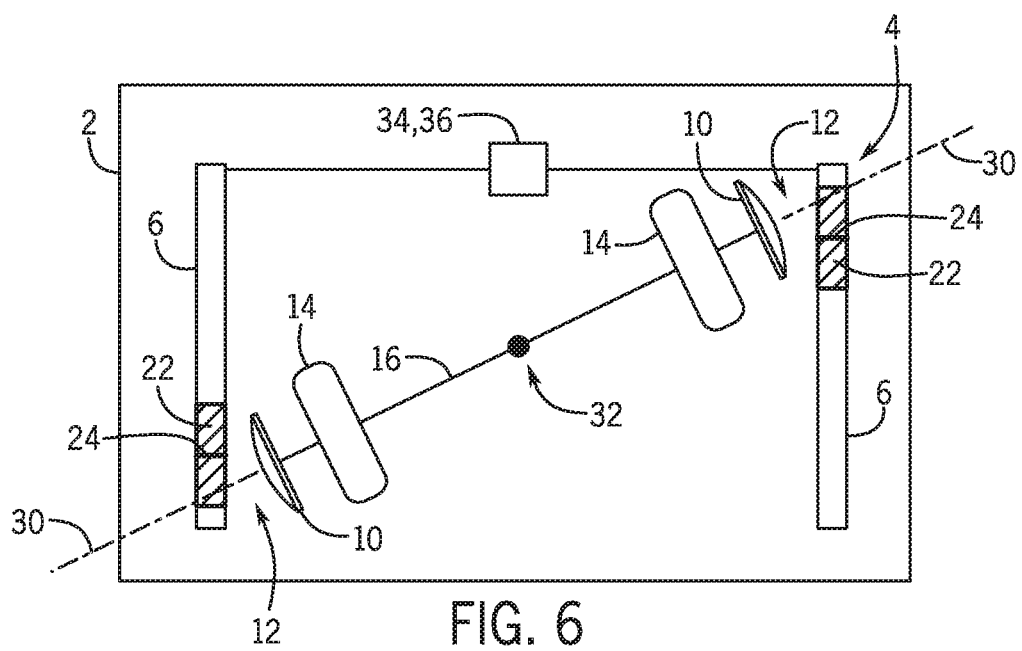
FIGS. 6-9 are schematic top views of vehicles including steering assemblies in accordance with the present subject matter.

FIG. 6 schematically depicts a vehicle 2, such as an automobile, truck, tractor, etc., having two wheels 14 determining the travel direction of the vehicle 2. The vehicle 2 includes an axle 16 upon which the two wheels 14 are arranged, and the axle 16 corresponds with the axis of rotation 30, which is shared by the two wheels 14. Each of the wheels 14 is associated with one charged plate 10. FIG. 6 depicts the axis of rotation 30 of the wheels 14 being not perpendicular to the array 6 (i.e. being in a turned state), such that the wheels 14 change the travel direction of (i.e. turn) the vehicle 2 during movement of the vehicle 2. This arrangement may cause the vehicle 2 to turn left.

The vehicle 2 can be steered by user input to the steering handle 34, which causes various electromagnets 8 to be activated and/or deactivated in each array 6 to produce a charged region 22 and centroid 24 and to cause coordinated movement of the charged regions 22 on the two arrays 6, which causes the charged plates 10 to follow the movement of the charged regions 22 about the array 6 because of their attraction to the oppositely charged arrays 6, which causes movement of the axle 16 and wheels 14, and therefore results in a pivoting of the axis of rotation 30 about point 32. Thus, the wheels 14 and axle 16 are moveable relative to the vehicle 2 and/or the arrays 6 as a result of user input to the steering handle 34. As depicted, the two arrays 6 are arranged on opposite sides of the two wheels 14. The arrays 6 are each paired/associated with one of the respective charge plates 10, and thus each array 6 is respectively associated with one of the wheels 14 as shown.

For each of the arrays 6, the charged region 22 and the associated centroid 24 may be moved about the array 6 in a desired manner to steer the vehicle 2 in a way indicated by the user input to the steering handle 34. Movement of the centroid 24 causes movement of the associated charged plate 10 due to the attraction between the first charge on the charged plate 10 and the second opposite charge of the array 6. The movement of the centroid 24 on each arrays 6 may be coordinated to cause a desired movement of the axis of rotation 30 of the wheels 14. Coordinated movement of the centroid 24 about the arrays 6 may include, but is not limited to, moving the centroids 24 on each array 6 in opposite directions on the arrays 6 (i.e. one moves up in the figure while one moves down in the figure), moving only one centroid 24 while keeping the other stationary, or moving both centroids 24 in the same direction but by a different distance. The charge on the two charged plates 10 may be the same or different, with a corresponding opposite charge produced by the respectively paired arrays 6.

Alternatively, a vehicle 2 with two wheels 14 that determine the travel direction of the vehicle 2 may include for example, two of the wheels depicted in FIGS. 7-8 as front wheels, with two additional back wheels that are not used to steer the vehicle 2. The vehicle 2 may include two arrays 6 of electromagnets 8 associated with each front wheel 14 and the two front wheels 14 do not necessarily share a common axis of rotation like that shown in FIG. 6.

FIGS. 7 and 8 schematically depict a vehicle 2, such as a motorcycle, powered scooter, etc., having two wheels but with only one wheel 14 determining the travel direction of the vehicle 2. The wheel 14 (e.g. front wheel) that determines the travel direction of the vehicle 2 is associated with two charged plates 10, one attached to each side of the wheel 14. FIG. 7 depicts the axis of rotation 30 of the wheel 14 being perpendicular to the arrays 6, such that the wheels 14 maintain the travel direction of the vehicle 2 during movement of the vehicle 2. This arrangement may cause the vehicle 2 to travel straight. FIG. 8 depicts the axis of rotation 30 of the wheels 14 being not perpendicular to the array 6 (i.e. being in a turned state), such that the wheel 14 changes the travel direction of (i.e. turn) the vehicle 2 during movement of the vehicle 2. This arrangement may cause the vehicle 2 to turn left.

The vehicle 2 can be steered by user input on the steering handle 34, which cause various electromagnets 8 to be activated and/or deactivated in the arrays 6 to cause coordinated movement of the charged regions 22 and centroids 24 about the two arrays 6, which causes the charged plates 10 to follow the movement of the charged regions 22 about the array 6 because of their attraction to the oppositely charged arrays 6, which causes movement of the axle 16 and wheels 14, and therefore results in a pivoting of the axis of rotation 30 about point 32. Thus, the wheel 14 and axle 16 are moveable relative to the vehicle 2 and/or the arrays 6 by user input made to the steering handle 34. As depicted, the two arrays 6 are arranged on opposite sides of the wheel 14. The arrays 6 are each paired with one of the respective charged plates 10 as shown. The charge on the two charged plates 10 may be the same or different, with a corresponding opposite charge produced by the respectively paired arrays 6.

FIG. 9 schematically depicts a vehicle 2 having two wheels 14 determining the travel direction of the vehicle 2. The wheels 14 are depicted as elongated drums, and each are associated with two charged plates 10, each arranged on opposite sides of each of the wheels 14. FIG. 9 depicts the axis of rotation 30 of each wheel 14 being not perpendicular to the respective arrays 6, such that the wheels 14 change the travel direction of (i.e. turn) the vehicle 2 during movement of the vehicle 2. The movement of the axis of rotation 30 of each wheel 14 may be coordinated so as to steer the vehicle 2. As depicted, the two axes of rotation 30 are rotated about point 32, are not perpendicular to the arrays 6, and intersect as a common vertex 38. This arrangement may cause the vehicle 2 to turn right.

User input on the steering handle 34 may cause coordinated movement of the charged regions 22 and centroids 24 about the four arrays 6, which results in a pivoting of the axis of rotation 30 for both wheels 14 about respective points 32. Optionally, the orientation of only one of the wheels 14 may be changed to steer the vehicle 2. As depicted, the four arrays 6 are arranged on opposite sides of the respective wheels 14. The arrays 6 are each paired with one of the respective charged plates 10 as shown.

In an embodiment, the wheel 14 may be powered through induction to rotate the wheel 14 about the axis of rotation 30 to move the vehicle 2 in a travel direction. In an embodiment, the wheels 14 or axle 16 may include an electromagnetic suspension, possibly utilizing the charged plates 10 to suspend the wheels 14 relative to the vehicle 2.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle steering assembly including:
an array of electromagnets, and
a charged plate arranged adjacent to the array and movable with respect to the array, the charged plate having a first charge and being connected to a wheel of a vehicle;
wherein upon activation of one or more of the electromagnets of the array, a charged region having a second charge opposite from the first charge is produced on the array;
wherein the charged region defines a centroid to which the charged plate is attracted and which is movable about the array by selective activation of one or more of the electromagnets of the array; and
wherein movement of the centroid about the array causes the charged plate to move relative to the array, which causes movement of an axis of rotation of the wheel to thereby steer the vehicle.

2. The vehicle steering assembly according to claim 1, wherein the wheel is not connected to mechanical steering linkages.

3. The vehicle steering assembly according to claim 1, wherein movement of a steering handle of the vehicle causes the movement of the centroid about the array.

4. The vehicle steering assembly according to claim 1, wherein the electromagnets are arranged in a radial configuration.

5. The vehicle steering assembly according to claim 1, wherein movement of the centroid about the array causes horizontal movement of the axis of rotation.

6. The vehicle steering assembly according to claim 1, wherein the charged plate is arranged on the wheel or on an axle connected to the wheel.

7. The vehicle steering assembly according to claim 1, wherein the array is in a fixed position relative to the vehicle.

8. The vehicle steering assembly according to claim 1, wherein:
the array is a first array, the charged plate is a first charged plate, the charged region is a first charged region, the centroid is a first centroid;
the first array and the first charged plate are arranged on a first side of the wheel;
the vehicle steering assembly further comprises a second array of electromagnets, and a second charged plate arranged adjacent to the second array and moveable with respect to the second array, the second charged plate having a third charge and being connected to the wheel,
the second array and the second charged plate are arranged on a second side of the wheel opposite from the first side;
upon activation of one or more of the electromagnets of the second array, a second charged region having a fourth charge opposite from the third charge is produced on the second array,
wherein the second charged region defines a second centroid to which the second charged plate is attracted and which is movable about the second array by selective activation of one or more of the electromagnets of the second array;

wherein movement of the second centroid on the second array causes the second charged plate to move relative to the second array, wherein movement of the second centroid on the second array is coordinated with movement of the first centroid on the first array such that coordinated movement of the first charged plate relative the first array and of the second charged plate relative to the second array causes movement of the axis of rotation of the wheel to thereby steer the vehicle.

9. The vehicle steering assembly according to claim 8, wherein:
the wheel is a first wheel;
the vehicle steering assembly further includes a second wheel sharing the axis of rotation of the first wheel; and
coordinated movement of the first charged plate relative the first array and of the second charged plate relative to the second array causes movement of the axis of rotation of the first and second wheels to thereby steer the vehicle.

10. A vehicle including a wheel and the vehicle steering assembly of claim 1, wherein the vehicle steering assembly is operably connected to the wheel.

11. A vehicle comprising:
a wheel having an axis of rotation, and
a steering assembly operably connected to the wheel to move the axis of rotation of the wheel to thereby steer the vehicle, the steering assembly including:
an array of electromagnets, and
a charged plate arranged on the wheel and adjacent to the array, and
moveable with respect to the array, the charged plate having a first charge;
wherein upon activation of one or more of the electromagnets of the array, a charged region having a second charge opposite from the first charge is produced on the array;
wherein the charged region defines a centroid to which the charged plate is attracted and which is movable about the array by selective activation of one or more of the electromagnets of the array; and
wherein movement of the centroid about the array causes the charged plate to move relative to the array, which causes movement of the axis of rotation of the wheel to thereby steer the vehicle.

12. The vehicle according to claim 11, further comprising a steering handle operable to selectively move the axis of rotation of the wheel to thereby steer the vehicle, wherein:
the steering assembly operably connects the steering handle to the wheel to allow the steering handle to selectively move the axis of rotation of the wheel,
wherein movement of the steering handle causes movement of the centroid about the array.

13. The vehicle according to claim 12, wherein the wheel is not connected to mechanical steering linkages.

14. The vehicle according to claim 11, wherein the electromagnets are arranged in a generally radial configuration.

15. The vehicle according to claim 11, wherein movement of the centroid about the array causes horizontal movement of the axis of rotation.

16. The vehicle according to claim 11, wherein the electromagnets are independently operable from each other to produce a magnetic field.

17. The vehicle according to claim 11, wherein the charged plate is arranged on the wheel or on an axle connected to the wheel.

18. The vehicle according to claim 11, wherein the array is in a fixed position relative to the vehicle.

19. The vehicle according to claim 12, wherein:
the array is a first array, the charged plate is a first charged plate, the charged region is a first charged region, the centroid is a first centroid;
the first array and the first charged plate are arranged on a first side of the wheel;
the steering assembly further comprises a second array of electromagnets, and a second charged plate arranged adjacent to the second array and moveable with respect to the second array, the second charged plate having a third charge and being connected to the wheel,
the second array and the second charged plate are arranged on a second side of the wheel opposite from the first side;
upon activating one or more of the electromagnets of the second array, a second charged region having a fourth charge opposite from the third charge is produced on the second array,
wherein the second charged region defines a second centroid to which the second charged plate is attracted and which is movable about the second array by selective activation of one or more of the electromagnets of the second array;
wherein movement of the second centroid on the second array causes the second charged plate to move relative to the second array,
wherein movement of the second centroid on the second array is coordinated with movement of the first centroid on the first array such that coordinated movement of the first charged plate relative the first array and of the second charged plate relative to the second array causes movement of the axis of rotation of the wheel to thereby steer the vehicle.

20. The vehicle according to claim 19, wherein:
the wheel is a first wheel;
the steering assembly further includes a second wheel sharing the axis of rotation of the first wheel; and
coordinated movement of the first charged plate relative the first array and of the second charged plate relative to the second array causes movement of the axis of rotation of the first and second wheels to thereby steer the vehicle.

* * * * *